United States Patent
Yang

(10) Patent No.: US 10,764,062 B2
(45) Date of Patent: Sep. 1, 2020

(54) BLOCKCHAIN LEDGER COMPRESSION

(71) Applicant: Alibaba Group Holding Limited, George Town (KY)

(72) Inventor: Xinying Yang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/804,680

(22) Filed: Feb. 28, 2020

(65) Prior Publication Data

US 2020/0204378 A1 Jun. 25, 2020

Related U.S. Application Data

(63) Continuation of application No. PCT/CN2020/071464, filed on Jan. 10, 2020.

(30) Foreign Application Priority Data

Jun. 3, 2019 (CN) .......................... 2019 1 0476242

(51) Int. Cl.
*H04L 9/32* (2006.01)
*H04L 9/06* (2006.01)

(52) U.S. Cl.
CPC .......... *H04L 9/3247* (2013.01); *H04L 9/0643* (2013.01); *H04L 2209/30* (2013.01); *H04L 2209/38* (2013.01)

(58) Field of Classification Search
CPC .................................................... H04L 9/3247
See application file for complete search history.

(56) References Cited

FOREIGN PATENT DOCUMENTS

| CN | 101183439 | 5/2008 |
|---|---|---|
| CN | 101295387 | 10/2008 |
| CN | 102291418 | 12/2011 |
| CN | 102710605 | 10/2012 |
| CN | 103714022 | 4/2014 |
| CN | 106251216 | 12/2016 |
| CN | 107181797 | 9/2017 |
| CN | 107728941 | 2/2018 |
| CN | 107819749 | 3/2018 |
| CN | 108242021 | 7/2018 |
| CN | 108563796 | 9/2018 |
| CN | 108920573 | 11/2018 |
| CN | 109391645 | 2/2019 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Simon P Kanaan
(74) *Attorney, Agent, or Firm* — Fish & Richardson P.C.

(57) ABSTRACT

A method includes: obtaining, by a server storing data in a blockchain ledger, compression point information of the blockchain ledger, in which the compression point information includes identification information of a specified data block, a server digital signature, and a user digital signature, in which the compression point information indicates that a specified portion of the blockchain ledger has passed an integrity verification, and in which the specified portion of the blockchain ledger includes data blocks in the blockchain ledger previous to the specified data block in the blockchain ledger; and compressing data of the specified portion of the blockchain ledger.

15 Claims, 3 Drawing Sheets

(56) References Cited

FOREIGN PATENT DOCUMENTS

| | | |
|---|---|---|
| CN | 109493043 | 3/2019 |
| CN | 110362568 | 10/2019 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2020/071464, dated Mar. 27, 2020, 18 pages (with machine translation).

BLOCKCHAIN LEDGER COMPRESSION

CROSS-REFERENCE TO RELATED APPLICATIONS

This application is a continuation of PCT Application No. PCT/CN2020/071464, filed on Jan. 10, 2020, which claims priority to Chinese Patent Application No. 201910476242.0, filed on Jun. 3, 2019 and each application is hereby incorporated by reference in its entirety.

TECHNICAL FIELD

Implementations of the present disclosure relate to the field of information technologies, and in particular, to compression methods and apparatuses for a blockchain-type ledger that stores data based on a blockchain data structure (e.g., in a form of a blockchain) and devices.

BACKGROUND

In a blockchain-type ledger, as services continue to increase, a quantity of data blocks in the ledger inevitably continues to increase, causing pressure to storage resources. However, in actual applications, many historical ledgers are seldom concerned by users.

SUMMARY

The implementations of the present application aim to provide effective compression solutions that can be used for a blockchain-type ledger.

To alleviate the previous technical problem, the implementations of the present application are implemented as follows:

A compression method for a blockchain-type ledger is provided, and the method is applied to a centralized server that stores data by using a blockchain-type ledger and includes: obtaining compression point information of the blockchain-type ledger, where the compression point information includes identification information of a specified data block, a server digital signature, and a user digital signature, and is used to indicate that a ledger before the data block has passed integrity verification; and performing data compression on the ledger before the specified data block.

Correspondingly, an implementation of the present specification further provides a compression apparatus for a blockchain-type ledger, and the apparatus is applied to a centralized server that stores data by using a blockchain-type ledger, and includes: an obtaining module, configured to obtain compression point information of the blockchain-type ledger, where the compression point information includes identification information of a specified data block, a server digital signature, and a user digital signature, and is used to indicate that a ledger before the data block has passed integrity verification; and a compression module, configured to perform data compression on the ledger before the specified data block.

In the solutions provided in the implementations of the present specification, compression point information of a ledger is previously created, and is used to prove that a part of the ledger before a data block has passed integrity verification. The part of the ledger is not usually used and can be compressed. In addition, the compression point information is approved by both a user and a server. Therefore, the part of the ledger that passes integrity verification can be compressed, thereby reducing storage space of the overall ledger and reducing storage costs of the server.

It should be understood that the previous general description and the following detailed description are merely examples and explanations, and are not intended to limit the implementations of the present specification.

In addition, any of the implementations in the present specification does not need to achieve all the previous effects.

BRIEF DESCRIPTION OF DRAWINGS

To describe the technical solutions in the implementations of the present specification or in the existing technology more clearly, the following briefly describes the accompanying drawings needed for describing the implementations or the existing technology. Clearly, the accompanying drawings in the following description merely show some implementations of the present specification, and a person of ordinary skill in the art can still derive other drawings from these accompanying drawings.

DESCRIPTION OF IMPLEMENTATIONS

To make a person skilled in the art better understand the technical solutions in the implementations of the present specification, the following describes in detail the technical solutions in the implementations of the present specification with reference to the accompanying drawings in the implementations of the present specification. Clearly, the described implementations are merely some but not all of the implementations of the present specification. All other implementations obtained by a person of ordinary skill in the art based on the implementations of the present specification shall fall within the protection scope of the present specification.

Figure 1:
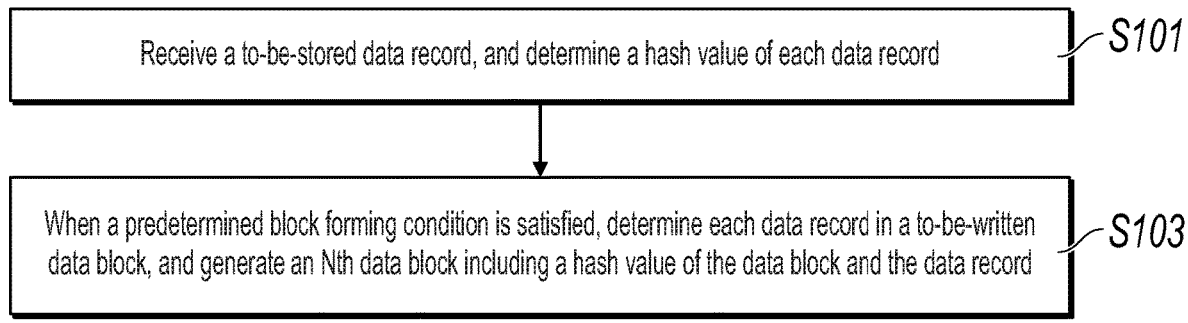
FIG. 1 is a schematic diagram illustrating a procedure of generating a blockchain-type ledger, according to an implementation of the present specification.

A centralized blockchain-type ledger in the implementations of the present specification is first described. At a centralized database service provider, a blockchain-type ledger is generated in the following method. As shown in FIG. 1, FIG. 1 is a schematic diagram illustrating a procedure of generating a blockchain-type ledger, according to an implementation of the present specification. The procedure includes the following steps.

S101. Receive a to-be-stored data record, and determine a hash value of each data record.

The to-be-stored data record here can be various expense records of an individual user of a client, or can be a service result, an intermediate state, an operation record, etc. that is generated by an application server when the application server executes service logic based on an instruction of a user. Specific service scenarios can include a consumption record, an audit log, a supply chain, a government supervision record, a medical record, etc.

S103. When a predetermined block forming condition is satisfied, determine each data record in a to-be-written data block to generate an $N^{th}$ data block that includes a hash value of the data block and the data record.

The predetermined block forming condition includes: a quantity of to-be-stored data records reaches a quantity threshold. For example, a new data block is generated each time one thousand data records are received, and the one thousand data records are written into the block. Alternatively, a time interval from a last block forming moment reaches a time threshold. For example, a new data block is generated every five minutes, and data records received in the five minutes are written into the block.

N here is a sequence number of a data block. In other words, in some implementation of the present specification, data blocks are arranged in a form of a blockchain and in a sequence of block forming times, and have a strong time sequence characteristic. Block heights of the data blocks are monotonously incremented in the sequence of block forming times. A block height can be a sequence number, and in this case, a block height of the $N^{th}$ data block is N. The block height can be generated in another method.

When N=1, that is, the data block in this case is an initial data block, a hash value and a block height of the initial data block are given based on a predetermined method. For example, if the initial data block includes no data record, the hash value is any given hash value, and the block height blknum=0. For another example, a trigger condition for generating the initial data block is consistent with a trigger condition for another data block, but the hash value of the initial data block is determined by performing hashing on all content in the initial data block.

When N>1, because content and a hash value of a previous data block (namely, a $(N-1)^{th}$ data block) are determined, a hash value of a current data block (the $N^{th}$ data block) can be generated based on the hash value of the previous data block. For example, in a feasible method, a hash value of each data record to be written into the $N^{th}$ data block is determined, a Merkle tree is generated in an arrangement order of the data records in the block, a root hash value of the Merkel tree is concatenated with the hash value of the previous data block, and the hash value of the current block is generated by using a hash algorithm again. For another example, data records in a block can be concatenated in a sequence of the data records, and a hash value of an overall data record is obtained by performing hashing on the data records, the hash value of the previous data block is concatenated with the hash value of the overall data record, and a hash operation is performed on a string obtained through concatenation to generate the hash value of the data block.

After successfully uploading data, a user can obtain and store a hash value of a corresponding data record and a hash value of a data block in which the data record is located, and can initiate integrity verification based on the hash value. A specific verification method is that the hash value of the data record and the hash value of the data block in which the data record is located are recalculated in a database, and the hash values are compared with locally stored hash values.

In the previous data block generation method, each data block is determined by using a hash value, and the hash value of the data block is determined by content and a sequence of data records in the data block and a hash value of a previous data block. The user can initiate verification at any time based on the hash value of the data block. Modification to any content in the data block (including modification to the content or the sequence of the data records in the data block) causes inconsistency between a hash value of the data block calculated during verification and a hash value calculated during generation of the data block, leading to a verification failure. As such, the hash value cannot be tampered in a centralized case.

When a blockchain-type ledger is verified, continuous integrity verification is usually performed on a specified segment of data blocks, or continuous integrity verification is performed from an initial data block. A verification method is as follows: A hash value of a previous data block is obtained, and a hash value of the data block is recalculated based on a data record in the data block and the hash value of the previous data block by using an algorithm the same as that used when a hash value of the data block is generated, and the hash value of the data block is compared with the previous hash value.

In this method, with continuous service development, there are more and more data blocks in a ledger, and a lot of historical data is no longer frequently accessed by the user. In addition, due to a feature of an association between a previous data block and a subsequent data block in a blockchain-type ledger (that is, subsequent verification of the ledger depends on the hash value of the previous data block), historical ledgers that are no longer frequently accessed cannot be randomly deleted.

Figure 2:
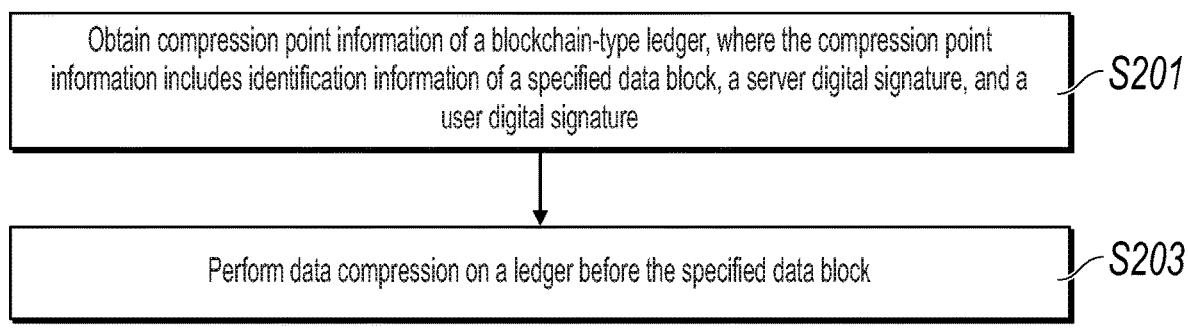
FIG. 2 is a schematic flowchart illustrating a compression method for a blockchain-type ledger, according to an implementation of the present specification.

Based on this, an implementation of the present specification provides a data compression solution based on compression point information, and the data compression solution is applied to a centralized server that stores data by using a blockchain-type ledger. As shown in FIG. 2, FIG. 2 is a schematic flowchart illustrating a compression method for a blockchain-type ledger, according to an implementation of the present specification. The method includes the following steps:

S201. Obtain compression point information of a blockchain-type ledger.

The compression point information is a trust point approved by both a server and a user. The compression point information includes identification information of a specified data block, a server digital signature, and a user digital signature, and is used to indicate that a part of the ledger before the specified data block has passed integrity verification.

A method that the two parties both approve the compression point information is as follows: The server digital signature is verified by the user and has no error, and the user digital signature is verified by the server and has no error.

The identification information of the specified data block can be a hash value of a data block, or can be a block height of a data block.

In addition, for one ledger, the server usually needs to store only one piece of corresponding compression point information. The compression point information can be previously generated and locally stored in the server.

In an implementation, the compression point information can be actively generated by the server, and a specific method is as follows:

The server obtains a part of the ledger before the specified data block, performs integrity verification on the part of the ledger, and generates verification success information after the verification succeeds. In this method, the specified data block can be obtained based on a predetermined condition of the server. For example, the server periodically monitors a query rate of a ledger. When the server finds that a ledger before a data block is invoked at a rate less than a predetermined value, the server determines the data block as a compression point, and performs integrity verification on a part of the ledger (that is, all data blocks from an initial data block to the compression point) before the compression point. For another example, the server periodically (for example, every month) determines a data block whose creation time exceeds one year and that is closest to a current time as the specified data block.

The server generates a server digital signature for the verification success information, and sends the verification success information including the server digital signature to a client, so that the client adds a user digital signature. The digital signature is conventional private key encryption, and the client can perform decryption verification on encrypted data by using a corresponding public key. After the verification succeeds, the client adds the user digital signature for the verification success information in a corresponding method, and returns the user digital signature to the server.

The server receives the user digital signature returned by the client for the verification success information, verifies the user digital signature, and if the verification succeeds, generates and stores the compression point information including the identification information of the specified data block, the server digital signature, and the user digital signature.

In another implementation, the compression point information can be proposed based on a user requirement. A specific implementation is as follows:

The server receives a compression point generation instruction of a user, and the compression point generation instruction includes an identifier of the specified data block. In this method, the specified data block can be specified by the user based on a requirement of the user, and an identifier of the specified data block can also be a hash value or a block height.

The server obtains a part of the ledger before the specified data block, and sends the part of the ledger to a client, so that the client performs integrity verification, and generates a user digital signature after the verification succeeds. In other words, in this method, the verification can also be completed by the client.

The server receives the user digital signature returned by a client for verification success information of the part of the ledger, adds a server digital signature for the verification success information, generates and stores the compression point information including the identification information of the specified data block, the server digital signature, and the user digital signature.

S203. Perform data compression on the ledger before the specified data block.

The ledger before the specified data block is all data blocks from an initial data block to the specified data block. Usually, the compression process can be performed asynchronously with generation of the compression point information.

Based on the identification information of the specified data block included in the compression point information, a block height of a corresponding data block can be determined, and it can be determined that all data blocks before the data block have passed integrity verification.

Usually, the compression process can be performed asynchronously with generation of the compression point information. Specifically, a compression time period can be that the server performs compression when the back end is idle. For example, the server determines that the back end is idle after a CPU and I/O continuously remains at relatively low utilization for a certain period of time and it is estimated that no storage peak arrives in a short time. Alternatively, the server sets a time period of each day (for example, 0:00 to 5:00 of each day) to an idle time period based on historical statistics, and performs compression in the idle time period.

In some implementations of the present specification, the compressed ledger may be merely not invoked temporarily, and can be re-browsed in the future. Therefore, in some implementations of the present specification, a specific compression method can be a lossless compression format, that is, original data can be completely recovered without any distortion. When the user needs to invoke the compressed ledger again, the user can recover the ledger at any time.

In the solution provided in the implementation of the present specification, compression point information of a ledger is previously created, and is used to prove that a part of the ledger before a data block has passed integrity verification. The part of the ledger is not usually used and can be compressed. In addition, the compression point information is approved by both a user and a server. Therefore, the part of the ledger that passes integrity verification can be compressed, thereby reducing storage space of the overall ledger and reducing storage costs of the server.

Figure 3:
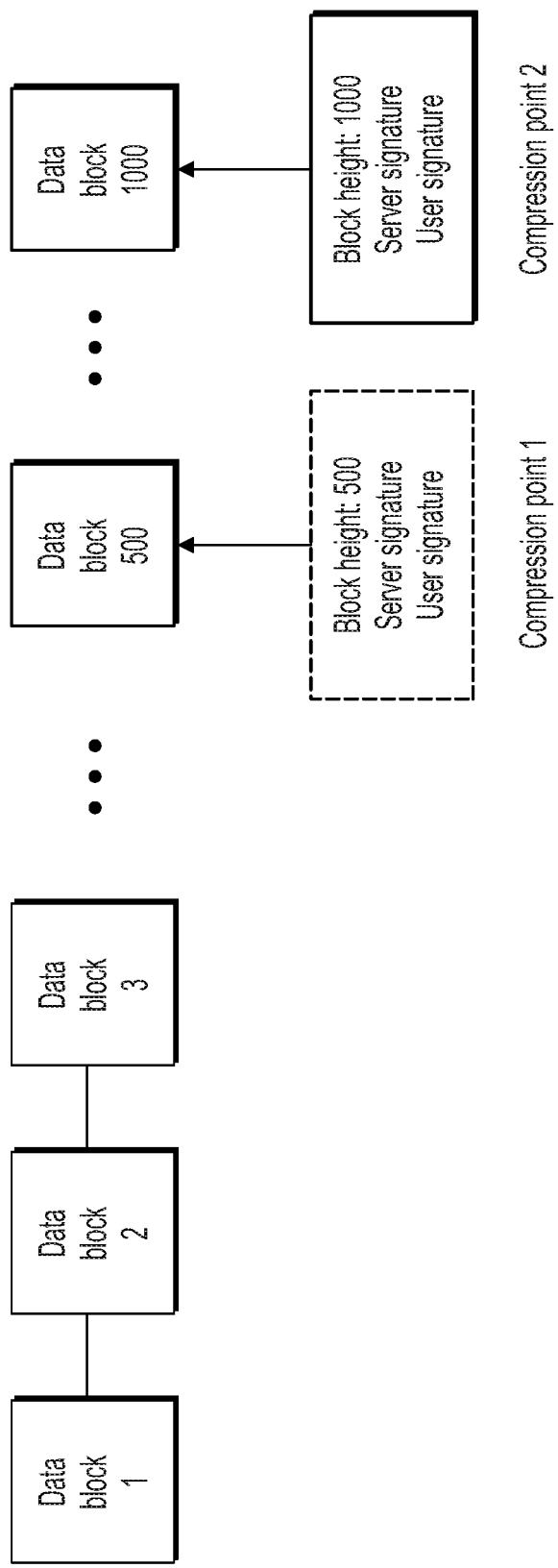
FIG. 3 is a schematic diagram illustrating increasing of compression point information, according to an implementation of the present specification.

In an implementation, the user can initiate a plurality times of compression on a historical ledger over time. In other words, a quantity of compression points also is monotonously increased over time. A specific implementation is as follows: The server locally previously stores a piece of compression point information. After another piece of compression point information is generated, the server compares respective block heights corresponding to specific data blocks in the stored compression point information and the another piece of compression point information, stores compression point information corresponding to a larger block height, and deletes compression point information corresponding to a smaller block height, so as to keep the block height corresponding to the compression point information monotonously increasing, thereby avoiding repeated compression. As is shown in FIG. 3, FIG. 3 is a schematic diagram illustrating increasing of compression point information, according to an implementation of the present specification. A block height corresponding to latest stored compression point information is always increased relative to that corresponding to the deleted compression point information. It is worthwhile to note that because one ledger has only one piece of compression point information, a relatively small compression point in the schematic diagram actually existed before, but has been deleted.

Figure 4:
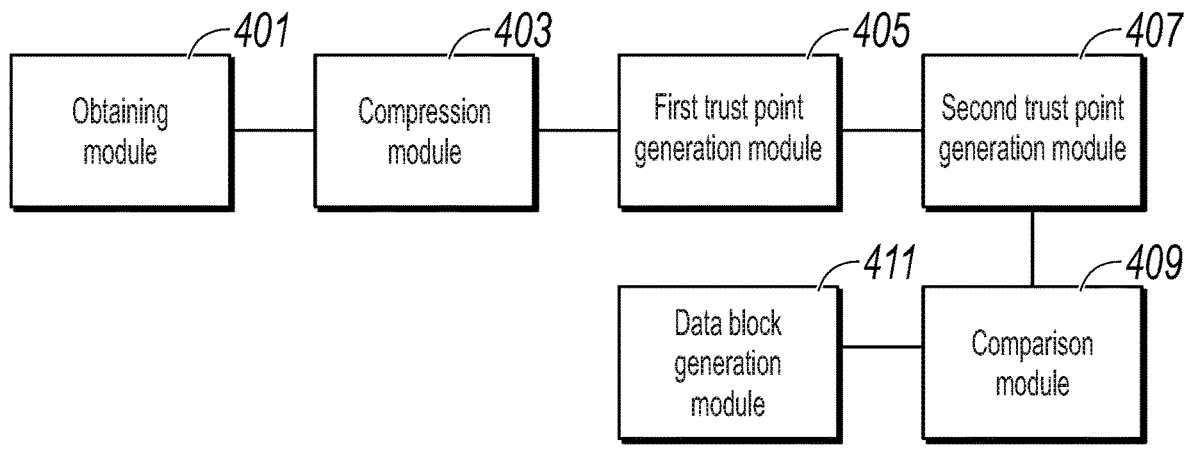
FIG. 4 is a schematic structural diagram illustrating a compression apparatus for a blockchain-type ledger, according to an implementation of the present specification.

Correspondingly, an implementation of the present specification further provides a compression apparatus for a blockchain-type ledger, and the compression apparatus is applied to a centralized server that stores data by using a blockchain-type ledger. As is shown in FIG. 4, FIG. 4 is a schematic structural diagram illustrating a compression apparatus for a blockchain-type ledger, according to an implementation of the present specification. The compression apparatus includes: an obtaining module 401, configured to obtain compression point information of the blockchain-type ledger, where the compression point information includes identification information of a specified data block, a server digital signature, and a user digital signature, and is used to indicate that a ledger before the data block has passed integrity verification; and a compression module 403, configured to perform data compression on the ledger before the specified data block.

Further, the apparatus includes a first trust point generation module 405, configured to: obtain a part of the ledger before the specified data block, perform integrity verification on the part of the ledger, and generate verification success information after the verification succeeds; generate a server digital signature for the verification success information, and send the verification success information including the server digital signature to a client, so that the client adds a user digital signature; and receive the user digital signature returned by the client for the verification success information; and generate and store the compression point information including the identification information of the specified data block, the server digital signature, and the user digital signature.

Further, the apparatus includes a second trust point generation module 407, configured to: receive a compression point generation instruction of a user, where the compression point generation instruction includes an identifier of the specified data block; obtain a part of the ledger before the specified data block, and send the part of the ledger to a client, so that the client performs integrity verification, and adds a user digital signature after the verification succeeds; receive the user digital signature returned by the client for verification success information of the part of the ledger; and perform server digital signature for the verification success information, generate and store the compression point information including the identification information of the specified data block, the server digital signature, and the user digital signature.

Further, when another piece of compression point information is generated, the apparatus further includes a comparison module 409, configured to: obtain separate block heights corresponding to specified data blocks in the stored compression point information and the another piece of compression point information, compare the two block heights, store compression point information corresponding to a larger block height, and delete compression point information corresponding to a smaller block height.

Further, the apparatus includes a data block generation module 411, configured to: receive a to-be-stored data record, and determine a hash value of each data record; and when a predetermined block forming condition is satisfied, the determining each data record in a to-be-written data block to generate an $N^{th}$ data block including a hash value of the data block and the data record specifically includes: when N=1, a hash value and a block height of an initial data block are given based on a predetermined method; and when N>1, a hash value of the $N^{th}$ data block is determined based on each data record in the to-be-written data block and a hash value of an $(N-1)^{th}$ data block, to generate the $N^{th}$ data block including the hash value of the $N^{th}$ data block, each data record, and a block forming time of the data block, where a block height of the data block is monotonically increased in a sequence of block forming times.

An implementation of the present specification further provides a computer device. The computer device includes at least a memory, a processor, and a computer program that is stored in the memory and that can run on the processor. When executing the program, the processor implements the compression method for a blockchain-type ledger shown in FIG. 2.

Figure 5:
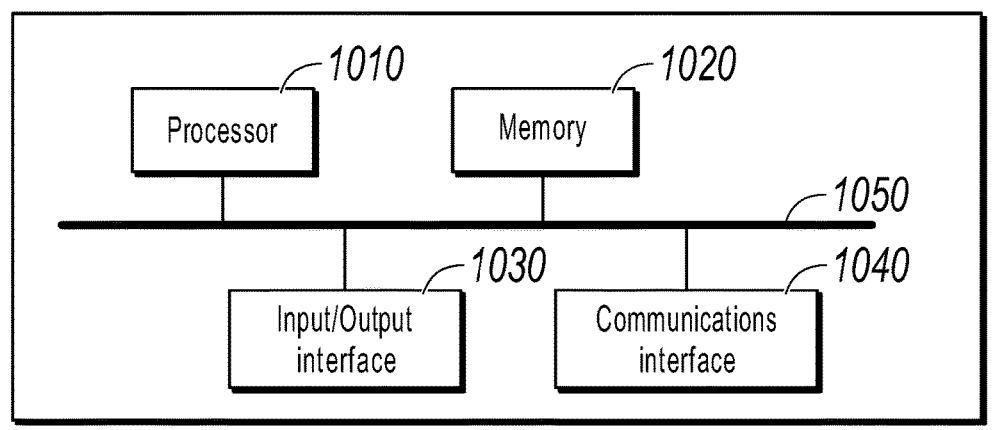
FIG. 5 is a schematic structural diagram illustrating a device used to configure the method in an implementation of the present specification.

FIG. 5 is a schematic structural diagram illustrating a more specific hardware structure of a computing device, according to an implementation of the present specification. The device can include a processor 1010, a memory 1020, an input/output interface 1030, a communications interface 1040, and a bus 1050. A communication connection between the processor 1010, the memory 1020, the input/output interface 1030, and the communications interface 1040 is implemented inside the device by using the bus 1050.

The processor 1010 can be implemented by using a common central processing unit (CPU), a microprocessor, an application specific integrated circuit (ASIC), one or more integrated circuits, etc., and is configured to execute a related program, to implement the technical solutions provided in the implementations of the present specification.

The memory 1020 can be implemented in a form of a read-only memory (ROM), a random access memory (RAM), a static storage device, a dynamic storage device, etc. The memory 1020 can store an operating system and another application program. When the technical solutions provided in the implementations of the present specification are implemented by using software or firmware, related program code is stored in the memory 1020, and is invoked and executed by the processor 1010.

The input/output interface 1030 is configured to connect to the input/output module to input and output information. The input output/module can be configured as a component in the device (not shown in the figure), or can be externally connected to the device to provide corresponding functions. The input device can include a keyboard, a mouse, a touchscreen, a microphone, various sensors, etc. The output device can include a display, a speaker, a vibrator, an indicator, etc.

The communications interface 1040 is configured to connect to a communications module (not shown in the figure), so as to implement communication and interaction between the device and another device. The communications module can implement communication in a wired method (for example, a USB or a network cable), or can implement communication in a wireless method (for example, a mobile network, WiFi, or Bluetooth).

The bus 1050 includes a channel for transmitting information between components (for example, the processor 1010, the memory 1020, the input/output interface 1030, and the communications interface 1040) of the device.

It is worthwhile to note that even though the previous device shows only the processor 1010, the memory 1020, the input/output interface 1030, the communications interface 1040, and the bus 1050, in a specific implementation process, the device can further include another component required to implement normal operation. In addition, a person skilled in the art can understand that the previous device can include only components required to implement the solutions in the implementations of the present specification, and does not need to include all the components shown in the figure.

An implementation of the present specification further provides a computer readable storage medium. The computer readable storage medium stores a computer program, and when a processor executes the program, the compression method for a blockchain-type ledger shown in FIG. 2 is implemented.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc ready-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present specification, the computer readable medium does not include computer readable transitory media such as a modulated data signal and carrier.

It can be seen from the previous descriptions of the implementations that, a person skilled in the art can clearly understand that the implementations of the present specification can be implemented by using software and a necessary common hardware platform. Based on such an understanding, the technical solutions in the implementations of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in the implementations of the present specification or in some parts of the implementations of the present specification.

The system, method, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

The implementations in the present specification are described in a progressive way. For same or similar parts of the implementations, references can be made to the implementations mutually. Each implementation focuses on a difference from other implementations. Particularly, a device implementation is similar to a method implementation, and therefore is described briefly. For a related part, references can be made to some descriptions in the method implementation. The previously described method implementations are merely examples. The modules described as separate parts can or cannot be physically separate. During implementation of the solutions in the implementations of the present application, functions of the modules can be implemented in one or more pieces of software and/or hardware. Some or all of the modules can be selected based on an actual need to implement the solutions of the implementations. A person of ordinary skill in the art can understand and implement the implementations of the present specification without creative efforts.

The previous descriptions are merely specific implementations of the implementations of the present application. It is worthwhile to note that a person of ordinary skill in the art can further make several improvements or polishing without departing from the principle of the implementations of the present application, and the improvements or polishing shall fall within the protection scope of the implementations of the present application.

What is claimed is:

1. A computer-implemented method, comprising:
   generating, by a server storing data in a blockchain ledger, compression point information of the blockchain ledger, wherein the compression point information comprises identification information of a specified data block, a server digital signature, and a user digital signature,
   wherein the compression point information indicates that a specified portion of the blockchain ledger has passed an integrity verification, and wherein the specified portion of the blockchain ledger comprises data blocks in the blockchain ledger previous to the specified data block in the blockchain ledger,
   wherein generating the compression point information comprises
      obtaining by the server, the specified portion of the blockchain ledger,
      verifying an integrity of the specified portion of the blockchain ledger,
      generating verification success information and the server digital signature subsequent to verifying the integrity of the specified portion of the blockchain ledger,
      sending the verification success information and the server digital signature to a client, and
      receiving, from the client, the user digital signature subsequent to the client verifying the server digital signature;
   compressing data of the specified portion of the blockchain ledger; and
   storing the compression point information comprising the identification information of the specified data block, the server digital signature, and the user digital signature.

2. The computer-implemented method of claim 1, comprising, before generating the compression point information:
   monitoring a query rate of the blockchain ledger; and
   determining that the specified portion of the blockchain ledger is invoked at a rate less than a predetermined value.

3. The computer-implemented method of claim 1, wherein the compression point information is first compression point information, the method further comprising:
   obtaining second compression point information;
      obtaining a first block height corresponding to the specified data block of the first compression point information and a second block height corresponding to a specified data block of the second compression point information;
      comparing the first and second block heights; and
         determining that the first block height is larger than the second block height, storing the first compression point information, and deleting the second compression point information, or
         determining that the second block height is larger than the first block height, storing the second compression point information, and deleting the first compression point information.

4. The computer-implemented method of claim 1, wherein compressing the data of the specified portion of the blockchain ledger is performed asynchronously with generating the compression point information.

5. The computer-implemented method of claim 1, wherein verifying the integrity of the specified portion of the blockchain ledger comprises comparing a recalculated hash value of a data block on the blockchain ledger and a stored hash value of the data block on the blockchain ledger.

6. A non-transitory, computer-readable medium storing one or more instructions executable by a computer system to perform operations comprising:

generating by a server storing data in a blockchain ledger, compression point information of the blockchain ledger, wherein the compression point information comprises identification information of a specified data block, a server digital signature, and a user digital signature, wherein the compression point information indicates that a specified portion of the blockchain ledger has passed an integrity verification, and wherein the specified portion of the blockchain ledger comprises data blocks in the blockchain ledger previous to the specified data block in the blockchain ledger, wherein generating the compression point information comprises
    obtaining by the server, the specified portion of the blockchain ledger,
    verifying an integrity of the specified portion of the blockchain ledger,
    generating verification success information and the server digital signature subsequent to verifying the integrity of the specified portion of the blockchain ledger,
    sending the verification success information and the server digital signature to a client, and
    receiving, from the client, the user digital signature subsequent to the client verifying the server digital signature;
compressing data of the specified portion of the blockchain ledger; and
storing the compression point information comprising the identification information of the specified data block, the server digital signature, and the user digital signature.

7. The computer-readable medium of claim 6, wherein the operations comprise, before generating the compression point information:
    monitoring a query rate of the blockchain ledger; and
    determining that the specified portion of the blockchain ledger is invoked at a rate less than a predetermined value.

8. The computer-readable medium of claim 6, wherein the compression point information is first compression point information, and wherein the operations further comprise:
    obtaining second compression point information;
        obtaining a first block height corresponding to the specified data block of the first compression point information and a second block height corresponding to a specified data block of the second compression point information;
    comparing the first and second block heights; and
        determining that the first block height is larger than the second block height, storing the first compression point information, and deleting the second compression point information, or
        determining that the second block height is larger than the first block height, storing the second compression point information, and deleting the first compression point information.

9. The computer-readable medium of claim 6, wherein compressing the data of the specified portion of the blockchain ledger is performed asynchronously with generating the compression point information.

10. The computer-readable medium of claim 6, wherein verifying the integrity of the specified portion of the blockchain ledger comprises comparing a recalculated hash value of a data block on the blockchain ledger and a stored hash value of the data block on the blockchain ledger.

11. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
    generating by a server storing data in a blockchain ledger, compression point information of the blockchain ledger, wherein the compression point information comprises identification information of a specified data block, a server digital signature, and a user digital signature,
wherein the compression point information indicates that a specified portion of the blockchain ledger has passed an integrity verification, and wherein the specified portion of the blockchain ledger comprises data blocks in the blockchain ledger previous to the specified data block in the blockchain ledger,
    wherein generating the compression point information comprises
        obtaining, by the server, the specified portion of the blockchain ledger,
        verifying an integrity of the specified portion of the blockchain ledger,
    generating verification success information and the server digital signature subsequent to verifying the integrity of the specified portion of the blockchain ledger,
        sending the verification success information and the server digital signature to a client, and
        receiving, from the client, the user digital signature subsequent to the client verifying the server digital signature;
    compressing data of the specified portion of the blockchain ledger; and
    storing the compression point information comprising the identification information of the specified data block, the server digital signature, and the user digital signature.

12. The computer-implemented system of claim 11, wherein the operations further comprise:
    monitoring a query rate of the blockchain ledger; and
    determining that the specified portion of the blockchain ledger is invoked at a rate less than a predetermined value.

13. The computer-implemented system of claim 11, wherein the compression point information is first compression point information, and wherein the operations further comprise:
    obtaining second compression point information;
        obtaining a first block height corresponding to the specified data block of the first compression point information and a second block height corresponding to a specified data block of the second compression point information;
    comparing the first and second block heights; and
        determining that the first block height is larger than the second block height, storing the first compression point information, and deleting the second compression point information, or
        determining that the second block height is larger than the first block height, storing the second compression point information, and deleting the first compression point information.

14. The computer-implemented system of claim 11, wherein compressing the data of the specified portion of the blockchain ledger is performed asynchronously with generating the compression point information.

15. The computer-implemented system of claim 11, wherein verifying the integrity of the specified portion of the blockchain ledger comprises comparing a recalculated hash value of a data block on the blockchain ledger and a stored hash value of the data block on the blockchain ledger.

\* \* \* \* \*

UNITED STATES PATENT AND TRADEMARK OFFICE
CERTIFICATE OF CORRECTION

PATENT NO. : 10,764,062 B2  
APPLICATION NO. : 16/804680  
DATED : September 1, 2020  
INVENTOR(S) : Xinying Yang Page 1 of 1

It is certified that error appears in the above-identified patent and that said Letters Patent is hereby corrected as shown below:

In the Claims

In Claim 1, Column 10, Line 12, delete "obtaining" and insert -- obtaining, --, therefor.

In Claim 6, Column 11, Line 1, delete "generating" and insert -- generating, --, therefor.

In Claim 6, Column 11, Line 15, delete "obtaining" and insert -- obtaining, --, therefor.

In Claim 11, Column 12, Line 8, delete "generating" and insert -- generating, --, therefor.

Signed and Sealed this  
Tenth Day of November, 2020

Andrei Iancu  
*Director of the United States Patent and Trademark Office*